June 6, 1950  A. G. JENMAN  2,510,228
CALCULATING DEVICE
Filed Nov. 20, 1947
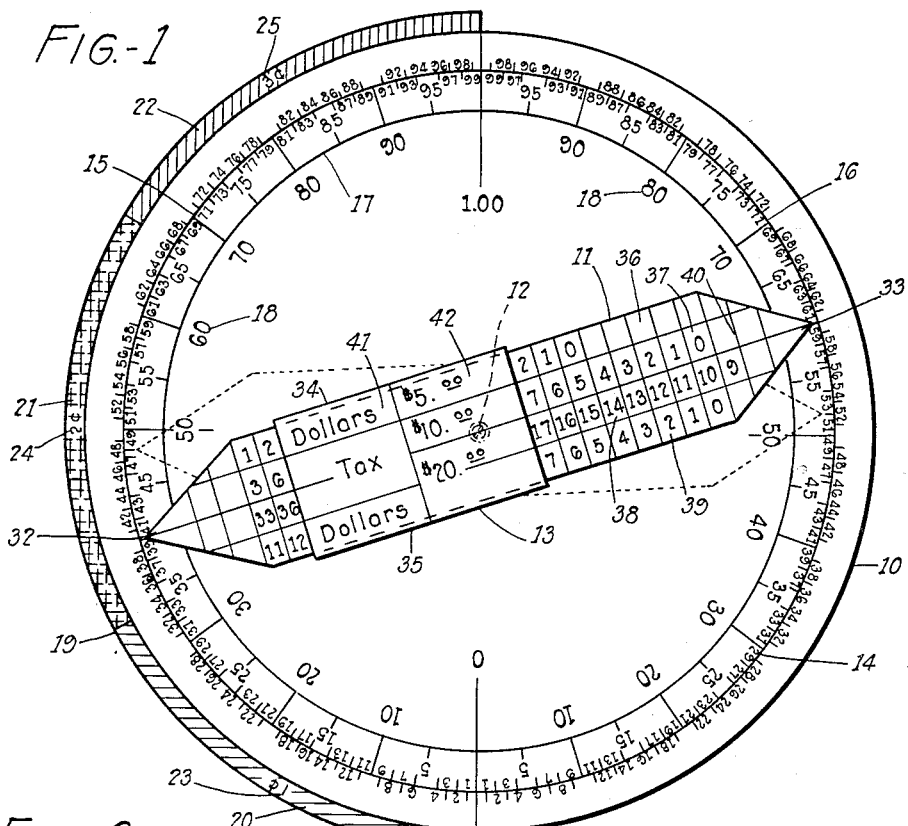
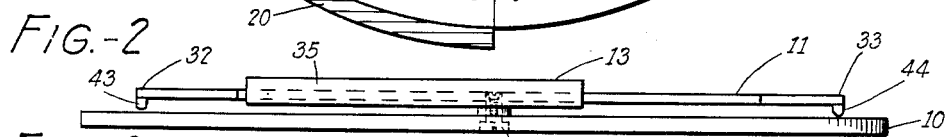
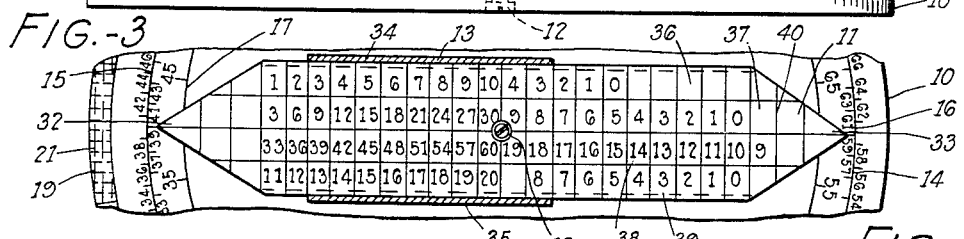
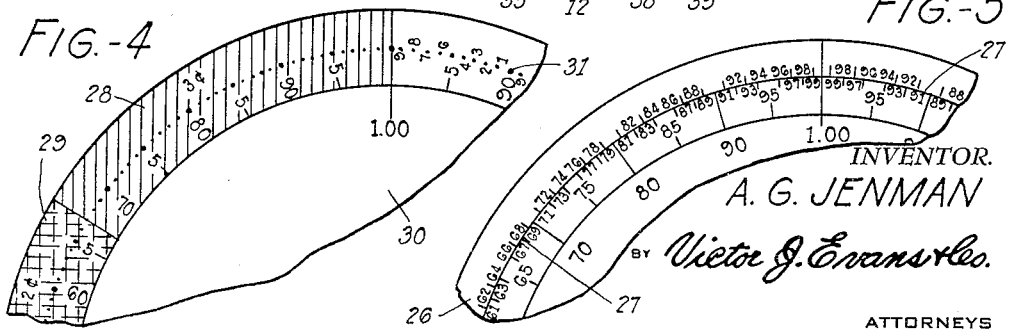
INVENTOR.
A. G. JENMAN
by Victor J. Evans & Co.
ATTORNEYS Patented June 6, 1950

2,510,228

UNITED STATES PATENT OFFICE 2,510,228

CALCULATING DEVICE

Alfred G. Jenman, Seattle, Wash., assignor to Lora Mildred Jenman, Cleveland, Ohio Application November 20, 1947, Serial No. 787,152

1 Claim. (Cl. 235—83)

This invention relates to calculating devices particularly as used in determining the amount of change, and in particular a disc having a circular scale thereon with the scale divided into two semi-circles having numerals from one to ninety-nine on each and with a pointer pivotally mounted on the center and having points at the ends registering with the scale and a slider for indicating dollars thereon.

The purpose of this invention is to facilitate calculating change particularly in making small purchases where it is necessary to subtract dollars and cents from bills, such as five, ten, and twenty dollar bills.

For the average purchaser it is difficult to subtract odd figures mentally and it is just as difficult for a cashier or clerk, and money changers in stores obviously make many mistakes. With this thought in mind this invention contemplates a relatively small calculator that may be carried in a purse, handbag, pocket, or in the hand that may readily be set to the amount of a purchase and which, without further manipulation, shows the amount of change, or the difference between the amount of the purchase and the amount of bills of predetermined denominations.

The object of this invention is, therefore, to provide a money change indicating device that is adapted to be used by both a purchaser and a cashier.

Another object of the invention is to provide a money change calculating device that is adapted to be carried and operated by a child.

A further object of this invention is to provide a money change calculator which is of a simple and economical construction.

With these and other objects and advantages in view the invention consists of the new and novel combination, construction, and arrangement of parts as hereinafter more fully described, set forth in the claim appended hereto, and disclosed in the accompanying drawings forming part hereof, wherein:

Figure 1 is a plan view of the change indicator showing the pointer in the position of indicating a sale of $2.40 in full lines and with eight cents tax added thereto in dotted lines.

Figure 2 is a view showing a side elevation of the device.

Figure 3 is a plan view of the device with the disc broken away and with the slider on the pointer shown in section.

Figure 4 shows a portion of the disc with part broken away illustrating a modification wherein a tax indicating color strip is formed on the disc.

Figure 5 is a similar view showing another modification wherein the tax color strip is omitted.

Referring now to the drawings wherein like reference characters indicate corresponding parts, the change indicator of this invention includes a disc 10 having a pointer 11 mounted by a pin 12 in the center thereof, and a slider 13 slidably mounted on the pointer.

The face of the disc is provided with a graduated scale 14 divided into two semi-circles 15 and 16 with each section having one hundred divisions of equal length thereon. The disc may also be provided with an equally divided inner circle 17, each division of which includes five divisions of the outer scale, and with numerals 18 placed thereon as shown, the amount of a sale, and also the amount of the change may readily be observed.

The disc may also be provided with a color strip 19 which is divided into sections 20, 21, and 22, each of which may be of a different color and each section may have the amount of sales tax thereon, as indicated by the numerals 23, 24, and 25, that corresponds with the amounts opposite thereto on the scale 14. The color strip may be omitted as shown in Figure 5, wherein the disc is indicated by the numeral 26 and the scale by the numeral 27, or the disc may be provided with color sections 28 and 29 as shown on the disc 30 in Figure 4, in which the disc is formed with a dotted scale 31, similar to the scale 14.

The pointer 11 is formed with pointed ends 32 and 33 and the slider 13 is slidably mounted thereon through ends 34 and 35 that extend over the edges of the pointer and under the lower surface thereof. The face of the pointer is divided into longitudinally extending rows 36, 37, 38, and 39, with numerals indicating dollars in divisions formed by transverse lines 40 in the rows 36 and 39, and with numerals indicating the amount of tax corresponding with the dollars in the intermediate rows 37 and 38. It will be noted that the numerals indicating the dollars are arranged in relation to the length of the slider wherein with a numeral showing at one end of the slider indicating the amount of dollars of a purchase the numeral showing at the opposite end will indicate the amount of dollars in the change from a bill of a certain denomination. The face of the slider illustrated in the drawing is provided with divisions 41, for the words "Dollars" and "Tax" and divisions 42, for the designations of bills. The ends of the pointer 11 are provided with projections 43 and 44, as shown in Figure 2, to hold the points above the disc.

With the parts arranged in this manner the point 32 may be set on the graduation 40 of the scale 14 and with the slider 13 set to show the numeral "2" at the adjacent end, it will indicate that the amount of the purchase is $2.40. At the same time the figures in the row 37 show that the tax is six cents, and the color strip at the side shows an added tax of two cents, so that the total tax is eight cents, making $2.48. The pointer may then be advanced to the position shown in dotted lines and the point 33 at the opposite end will indicate that the change portion of a dollar for $5.00 is $0.52, the $2.00 being indicated on the pointer at the end of the slider. At the same time the device indicates that the change for $10.00 is $7.52, and for $20.00 is $17.52. By this means change may be indicated for substantially any amount.

It will be understood that the positions of the figures may be changed, or the numerals may be arranged in columns, with the dollars and other parts stationary, and also that other modifications may be made in the design or arrangement of the parts without departing from the spirit of the invention.

What is claimed is:

A change determining device comprising a disc providing a base having an inner circle described thereon and an outer circle concentric to the inner circle and positioned between the said inner circle and periphery of the base, said base having equally spaced graduations between the circles, the outer circle having two hundred divisions thereon with the divisions numbered from one to ninety-nine on each side of a point designated as zero and with each of the divisions of the inner circle being spaced to include five divisions of the outer circle and numbered in multiples of five extending from five to one hundred on each side of the zero point, the left hand edge of said base having a colored border thereon extended from the zero point to one hundred with the border divided into three equal parts with the first part extended from the zero indicating a tax of one cent, the second part a tax of two cents, and the third part a tax of three cents, a double end pointer pivotally mounted on the center of said base and having four rows of numerals thereon with the first row running from one to ten on the left hand side of the center, the last row running from eleven to twenty on the left hand side of the center, the second row running from three to thirty in multiples of three on the left hand side of the center and the third row from thirty-three to sixty also in multiples of three and also on the left hand side of the center, and with the first row of numerals on the right hand side of the center running from four to zero, the second row from nine to zero, the third row from nineteen to nine and the last row running from eight to zero leaving a blank space between the center and the number eight, and a slider slidably mounted on said pointer with the designation five dollars on the right hand end positioned in line with the first row of numerals on the pointer, ten dollars on the right hand side and in line with the second row of numerals, and twenty dollars also on the right hand side and in line with the third row of numerals on the pointer, said slider having the word dollars on the left hand side of the center and in line with the first and last row of numerals and the word tax on the left hand end in line with the second and third rows of numerals, the length of said slider being such that with the left hand end positioned beside the numeral in the upper row of numerals the first numeral beyond the opposite end in the first row indicates the dollars in change for five dollars with the purchase price indicated by the numeral at the left hand end, whereby with the point on the left hand end of the pointer positioned on the scale indicating the cents portion of a sale and with the slider positioned with the dollars of the sale shown at the left hand end thereof the total amount of a sale in dollars and cents is indicated and the change from a bill of a certain denomination is indicated by the point on the right hand end of the pointer with the change portion indicated on the scale on the right hand side of the base and the dollar portion shown on the pointer at the right hand end of the slider, and with the tax indicated on the pointer in the second row of numerals and at the left hand end of the slider added to the tax indicated by the colored border and with the sum added to the amount of the purchase the resulting change portion of a dollar for the total purchase and tax is indicated on the opposite side of the device with the dollar portion of the change indicated on the pointer at the right hand end of the slider.

ALFRED G. JENMAN.

REFERENCES CITED

The following references are of record in the file of this patent:

UNITED STATES PATENTS

| Number | Name | Date |
| --- | --- | --- |
| 424,574 | Quirin | Apr. 1, 1890 |
| 769,044 | Anderson | Aug. 30, 1904 |
| 2,118,773 | Ball | May 24, 1938 |

FOREIGN PATENTS

| Number | Country | Date |
| --- | --- | --- |
| 731,375 | France | May 30, 1932 |